(12) United States Patent
Takeuchi et al.

(10) Patent No.: US 7,003,172 B2
(45) Date of Patent: Feb. 21, 2006

(54) IMAGE PROCESSING TECHNIQUE FOR IMAGES PROJECTED BY PROJECTOR

(75) Inventors: Kesatoshi Takeuchi, Shiojiri (JP); Kazuyoshi Nakamura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 575 days.

(21) Appl. No.: 10/190,696

(22) Filed: Jul. 9, 2002

(65) Prior Publication Data

US 2003/0035590 A1  Feb. 20, 2003

(30) Foreign Application Priority Data

Jul. 16, 2001  (JP)  ............................. 2001-215496

(51) Int. Cl.
  *G06K 9/00*  (2006.01)
  *H04N 5/64*  (2006.01)
  *G03B 21/00*  (2006.01)

(52) U.S. Cl. .................. 382/254; 348/744; 353/70
(58) Field of Classification Search ................ 382/254, 382/266, 260, 295, 305, 255; 345/87, 204; 348/136, 827, 222.1, 744–746; 353/70, 101
See application file for complete search history.

(56) References Cited

U.S. PATENT DOCUMENTS

| | | | | |
|---|---|---|---|---|
| 5,086,411 A | * | 2/1992 | Dalglish | ..................... 365/106 |
| 5,200,815 A | * | 4/1993 | Tsujihara et al. | ........... 348/181 |
| 5,465,102 A | * | 11/1995 | Usui et al. | ..................... 345/89 |
| 5,836,664 A | * | 11/1998 | Conner et al. | ................. 353/70 |
| 6,104,443 A | * | 8/2000 | Adcock et al. | ............. 348/827 |
| 6,499,846 B1 | * | 12/2002 | Hiller et al. | ................... 353/50 |
| 6,642,971 B1 | * | 11/2003 | Takeuchi | ..................... 348/746 |
| 6,666,558 B1 | * | 12/2003 | Yamagishi et al. | ........... 353/94 |
| 6,753,907 B1 | * | 6/2004 | Sukthankar et al. | ...... 348/222.1 |
| 2001/0017619 A1 | * | 8/2001 | Takeuchi | ..................... 345/204 |

FOREIGN PATENT DOCUMENTS

| | | |
|---|---|---|
| JP | A 62-193459 | 8/1987 |
| JP | A 03-029577 | 2/1991 |
| JP | A 05-130452 | 5/1993 |
| JP | A 05-276386 | 10/1993 |
| JP | A 06-003577 | 1/1994 |
| JP | A 07-015692 | 1/1995 |
| JP | A 07-162712 | 6/1995 |
| JP | A 10-171045 | 6/1998 |
| JP | A 10-319506 | 12/1998 |
| JP | A 2000-013665 | 1/2000 |

* cited by examiner

*Primary Examiner*—Kanjibhai Patel
(74) *Attorney, Agent, or Firm*—Oliff & Berridge, PLC (57) ABSTRACT

The technique of the present invention carries out specific image processing that emphasizes articulation of display with a varying degree of emphasis for respective sites of an image projected by a projector. A typical example of such image processing is sharpness adjustment. The degree of emphasis in sharpness adjustment at each site is specified, based on an elevation angle of the projector and a focalized position of the projected image. The technique of the invention thus readily prevents deterioration of the image quality due to out-of-focus state of the projected image.

10 Claims, 12 Drawing Sheets

(PRIOR ART)

(PRIOR ART)

IMAGE PROCESSING TECHNIQUE FOR IMAGES PROJECTED BY PROJECTOR

BACKGROUND OF THE INVENTION

1. Field of the Invention

The present invention relates to an image processing technique applied for images projected by a projector.

2. Description of the Related Art

A projector modulates light emitted from a light source based on image data with its light modulation means, such as a liquid crystal panel, and displays a resulting image on a screen. 'Elevated projection' is often adopted to prevent any obstacle between the projector and the screen from interfering with the view of the projected image.

Figure 11A:
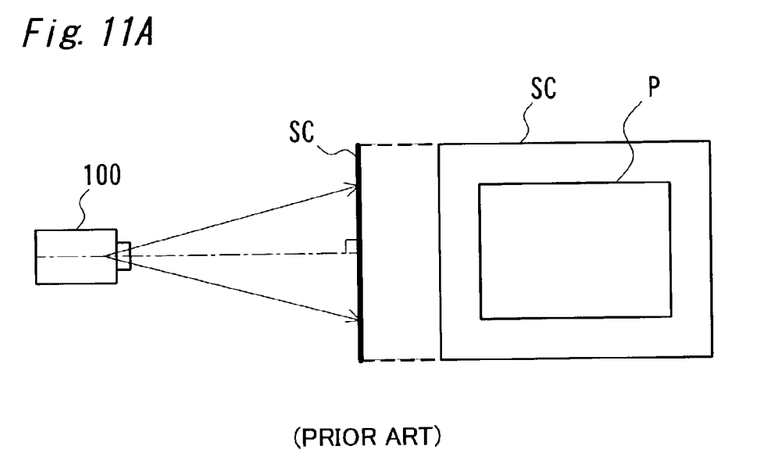
FIG. 11 shows projection of an image on a screen SC with a prior art projector.
Figure 11B:
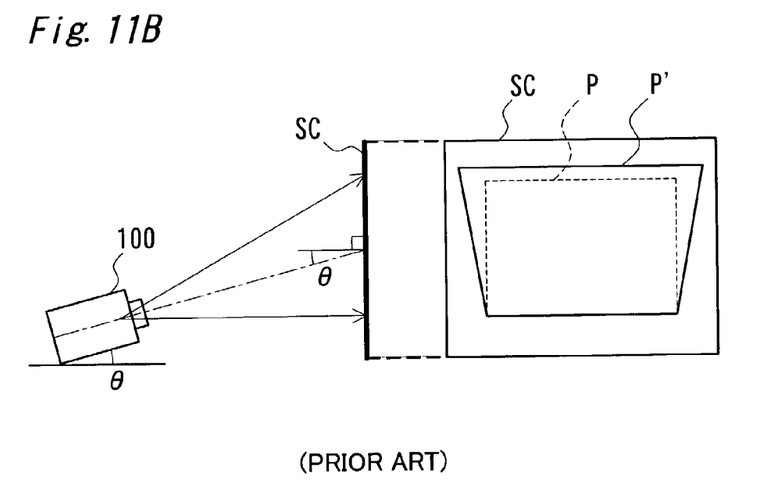

FIG. 11 shows projection of an image on a screen SC with a prior art projector 100. In the example of FIG. 11A, an elevation angle, that is, an angle defined by an optical axis of the projector 100 and a normal line of the screen SC, is equal to 0. A resulting projected image P is rectangle without any significant distortion. In the example of FIG. 11B, the elevation angle is θ (≠0). A resulting projected image P' has trapezoidal distortion or keystone distortion.

The image processing technique to correct the trapezoidal distortion to a rectangle has been widely used.

Figure 12:
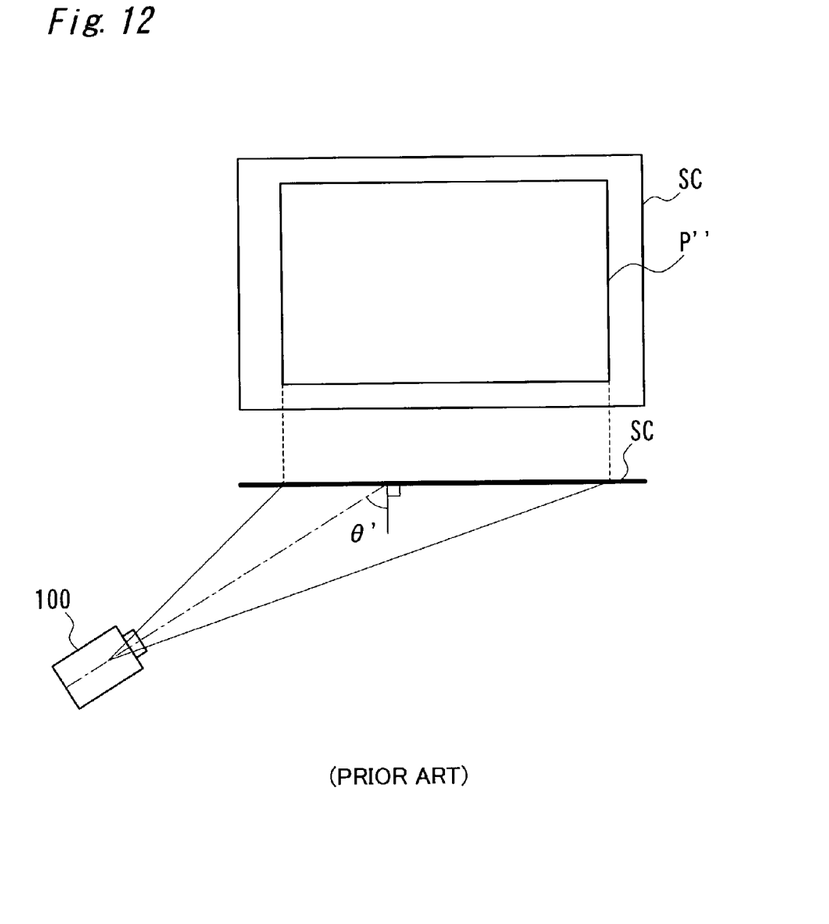
FIG. 12 shows elevated projection at an elevation angle θ' in a horizontal direction with the prior art projector.

Elevated projection may be performed in the horizontal direction. In the specification hereof, the 'elevated projection' includes inclination of the optical axis of the projector in the vertical direction relative to the normal line of the screen SC and inclination in the horizontal direction. FIG. 12 shows elevated projection at an elevation angle θ' in the horizontal direction with the prior art projector 100. In this case, the image processing is carried out to correct the shape of a resulting projected image P" to a rectangle.

Adjustment of the focal distance of the projection lens in the projector is required for clear projection of the image on the screen SC. There is, however, strictly only one focalized site on the screen SC, and the other sites are in slight out-of-focus state. The projected image at such sites is out of focus and rather blurred. The deterioration of the image quality due to the out-of-focus state is especially distinctive under the condition of a large elevation angle and in front projectors where the projection distance and the elevation angle are arbitrarily settable.

The deterioration of the image quality is not restricted to the elevated projection, but is commonly observed in any projection of the image. Any improvement of the optical system can not sufficiently solve this problem.

SUMMARY OF THE INVENTION

The object of the present invention is thus to provide a technique of preventing deterioration of image quality due to out-of-focus state in an image projected by a projector.

At least part of the above and the other related objects is attained by an image processing apparatus that carries out a predetermined series of image processing with regard to original image data, so as to generate processed image data, which is supplied to a projector that projects a resulting image. The image processing apparatus includes: an original image data input module that receives input of original image data; and an image processing module that makes the original image data subjected to specific image processing that emphasizes articulation of display with a varying degree of emphasis for respective sites of the projected image.

As described above, there is strictly only one focalized site of a projection lens on the screen in projection of an image by the projector. The slight out-of-focus state in other sites of the image lowers the articulation of display. Namely, the different sites of the projected image have different degrees of lowered articulation of display.

The image processing apparatus generally performs uniform image processing over the original image data. The technique of the present invention varies the degree of emphasis at each site of the projected image while carrying out the image processing for the original image data to emphasize the articulation of display and compensate for the deteriorated image quality. This arrangement thus effectively prevents deterioration of the image quality due to the out-of-focus state without any optical adjustment of the focal distance at each site. Here 'each site' may be 'each pixel' or 'each area'.

In the image processing apparatus of the present invention, the specific image processing to emphasize the articulation of display may be any of diverse image processing, such as contrast adjustment or luminance adjustment.

It is, however, preferable that the specific image processing is sharpness adjustment.

This arrangement carries out the sharpness adjustment according to the out-of-focus degree at each site of the image, thus effectively preventing deterioration of the image quality. The sharpness adjustment may affect the contrast and the luminance of the image, so that the contrast adjustment and the luminance adjustment may also be performed according to the degree of emphasis in sharpness adjustment.

In the image processing apparatus of the present invention, it is preferable that the degree of emphasis is varied depending upon a distance from a reference point set relative to the projected image.

In general, the image quality is lowered in a concentric manner about the focalized point. Emphasis of the articulation of display with the varying degree according to the distance from the reference point effectively prevents deterioration of the image quality. The 'reference point' is set relative to the projected image, and is not restricted to a point on the projected image. Namely the reference point may be set out of the projected image. The reference point may be a preset point or a point arbitrarily set by the user.

In the image processing apparatus, it is preferable that the reference point is a focalized position of the projected image.

The picture quality of the image projected on the screen is lowered about the focalized position. Setting the focalized position to the reference point thus more effectively prevents deterioration of the image quality.

The focalized position may be detected with eyes of the user.

In one preferable application of the present invention, the image processing apparatus further includes: an imaging module that picks up the projected image; and a focalized position detection module that analyzes the pickup image to detect the focalized position.

This application automatically detects the focalized position and utilizes the detected focalized position as the reference point, thus desirably enhancing the convenience of the image processing apparatus. Detection of the focalized position may be performed by projecting a test image having a predetermined spatial frequency with the projector, picking up the projected image, and analyzing the distribution of the spatial frequency in the pickup image. The focalized position is accurately detected according to the distribution of the spatial frequency in the pickup test image.

In the image processing apparatus, it is also preferable that the degree of emphasis is varied depending upon an angle defined by an optical axis of the projector and a normal line of a screen on which the image is projected.

The degree of emphasis in image processing at each site is flexibly set according to the diverse installation conditions of the projector. The 'optical axis of the projector' is synonymous with the optical axis of the projection optical system included in the projector or the optical axis of the projection lens. In the specification hereof, the angle defined by the optical axis of the projector and the normal line of the screen is also referred to as 'elevation angle'.

In the image processing apparatus, the elevation angle may be set by the user according to the installation conditions of the projector.

In one preferable embodiment, the image processing apparatus further has an elevation angle detection module that detects the elevation angle, which is defined by the optical axis of the projector and the normal line of the screen on which the image is projected.

The arrangement of this embodiment automatically detects the elevation angle and utilizes the detected elevation angle, thus desirably enhancing the convenience of the image processing apparatus. One example of the elevation angle detection module measures distances to specified three points on the screen with an ultrasonic sensor and detects the elevation angle based on the measurement result. The elevation angle in the vertical direction may be detected in cooperation with a leg for adjusting the elevation angle of the projector in the vertical direction.

In accordance with another preferable application of the present invention, the image processing apparatus further includes a compensation coefficient storage module that stores in advance a mapping of a compensation coefficient, which is used for emphasizing the articulation of display, to each site. The image processing module carries out the specific image processing with the compensation coefficient given by the compensation coefficient storage module.

This arrangement enables the compensation coefficient to be read from the compensation coefficient storage module according to the requirements, thus ensuring high-speed image processing.

Another application of the present invention is a projector.

The application of the present invention is not restricted to the image processing apparatus or the projector. There are, however, a diversity of other applications of the present invention, for example, an image processing method, a computer program attaining such a method, a recording medium in which such a computer program is recorded, and a data signal including such a computer program and being embodied in a carrier wave. The various additions and modifications described above are applicable to any of these embodiments.

When the technique of the present invention is actualized as any of the computer program, the recording medium, and the data signal, the computer program may be the whole program for driving the image processing apparatus or the projector or only the partial program for attaining the characterized functions of the present invention. Typical examples of the recording medium include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a variety of other computer readable media.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
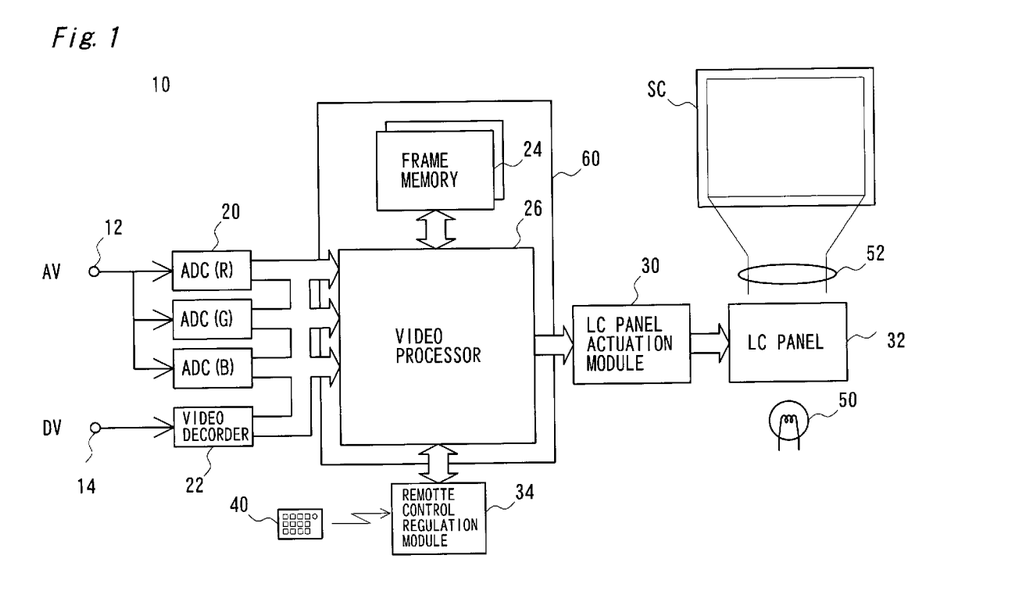
FIG. 1 shows the general construction of a projector in one embodiment of the present invention.

One mode of carrying out the present invention is discussed below as a preferred embodiment in the following sequence:
A. General Construction of Projector
B. Internal Structure of Video Processor
C. Contour Compensation
D. Modifications A. General Construction of Projector FIG. 1 shows the general construction of a projector 10 in one embodiment of the present invention. The projector 10 has an analog image input terminal 12, a digital image input terminal 14, three A–D converters 20, a video decoder (synchronizing separation circuit) 22, a frame memory 24, a video processor 26, a liquid crystal panel actuation module 30, a liquid crystal panel 32, and a remote control regulation module 34. The frame memory 24 and the video processor 26 are integrated as one image processing integrated circuit 60.

The projector 10 is further provided with a lighting unit 50 for illuminating the liquid crystal panel 32 and a projection optical system 52 for projecting transmitted light through the liquid crystal panel 32 onto a screen SC. The liquid crystal panel 32 is a transmission-type liquid crystal panel and is used as a light valve for modulating the illumination light emitted from the lighting unit 50. The liquid crystal panel 32 corresponds to the image generation module of the present invention. The lighting unit 50 and the projection optical system 52 correspond to the projection optical system of the present invention. The constituents other than the liquid crystal panel 32, the lighting unit 50, and the projection optical system 52 correspond to the image processing module or the image processing apparatus of the present invention.

Although not being specifically illustrated, the projector 10 has three liquid crystal panels 32 for three colors R, G, and B. The respective circuits have the function of processing image signals of the three colors. The lighting unit 50 has a color light separation optical system for dividing white light into three color light components. The projection optical system 52 has a composition optical system that combines three color image rays to generate image light representing a color image. The construction of the optical system in the projector (projection-type display apparatus) is described in detail, for example, in JAPANESE PATENT LAID-OPEN GAZETTE No. 10-171045 disclosed by the applicants of the present invention, and is thus not specifically discussed here.

Either an analog video signal AV input into the analog image input terminal 10 or a digital video signal DV input into the digital image input terminal 12 is selectively applicable for an input video signal. The analog video signal AV is converted into a digital video signal including three color video signal components by the A–D converters 20.

The video signal input into the video processor 26 is temporarily written into the frame memory 24, and is read from the frame memory 24 to be supplied to the liquid crystal panel actuation module 30. The video processor 26 carries out diverse series of image processing with regard to the input video signal in the course of this writing and reading operation. The liquid crystal panel actuation module 30 generates a driving signal to actuate the liquid crystal panel 32, in response to the input video signal. The liquid crystal panel 32 modules the illumination light in response to the driving signal.

The user utilizes a remote control 40 to input preset values for diverse adjustments, which include overall adjustments over the whole image and individual adjustments with regard to the respective pixels. The former includes adjustments of sharpness, contrast, and luminance. The latter includes adjustment of sharpness according to the installation conditions of the projector 10. Although not specifically illustrated, the user may input these preset values through operations of keys and buttons provided on the main body of the projector 10.

B. Internal Structure of Video Processor

Figure 2:
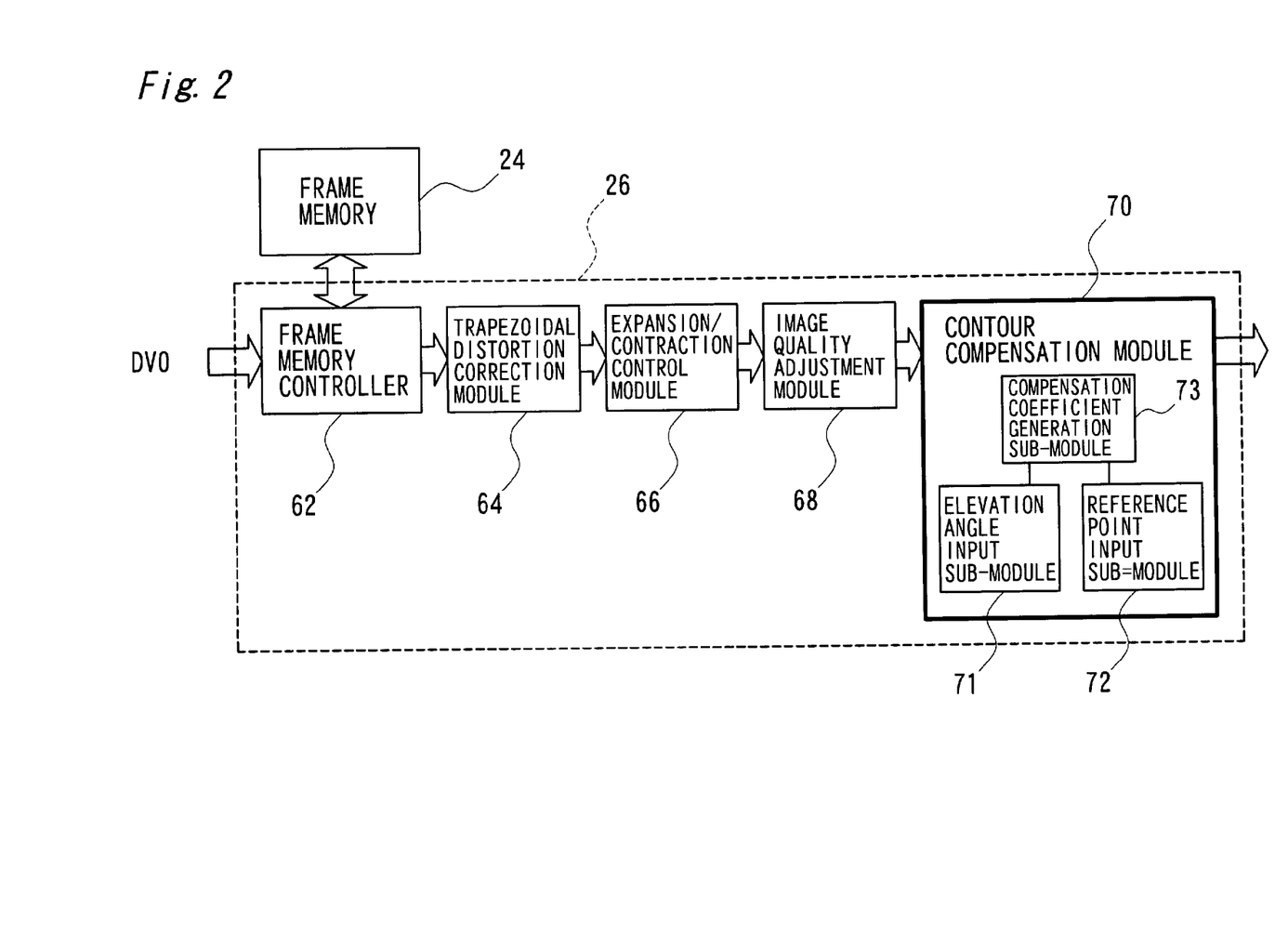
FIG. 2 is a block diagram illustrating the internal structure of a video processor included in the projector of FIG. 1.

FIG. 2 is a block diagram illustrating the internal structure of the video processor 26. The video processor 26 includes a frame memory controller 62, a trapezoidal distortion correction module 64, an expansion/contraction control module 66, an image quality adjustment module 68, and a contour compensation module 70.

The frame memory controller 62 controls the writing operation of a digital video signal DV0, which has been supplied from either the A–D converter 20 or the video decoder 22, into the frame memory 24, as well as the reading operation of a digital video signal from the frame memory 24.

The trapezoidal distortion correction module 64 carries out a series of image processing to correct a trapezoidal distortion in elevated projection. The expansion/contraction control module 66 performs expansion or contraction of the image according to the user's settings, and carries out interpolation, when necessary, at the time of expansion or contraction. The image quality adjustment module 68 adjusts the contrast, the luminance, and the sharpness of the whole image according to the user's settings. The series of processing carried out by the trapezoidal distortion correction module 64, the expansion/contraction control module 66, and the image quality adjustment module 68 are known in the art and are not specifically discussed here.

The contour compensation module 70 carries out adjustment of sharpness with varying intensities to the respective pixels according to the installation conditions of the projector 10. The contour compensation module 70 includes an elevation angle input sub-module 71, a reference point input sub-module 72, and a compensation coefficient generation sub-module 73.

Figure 3:
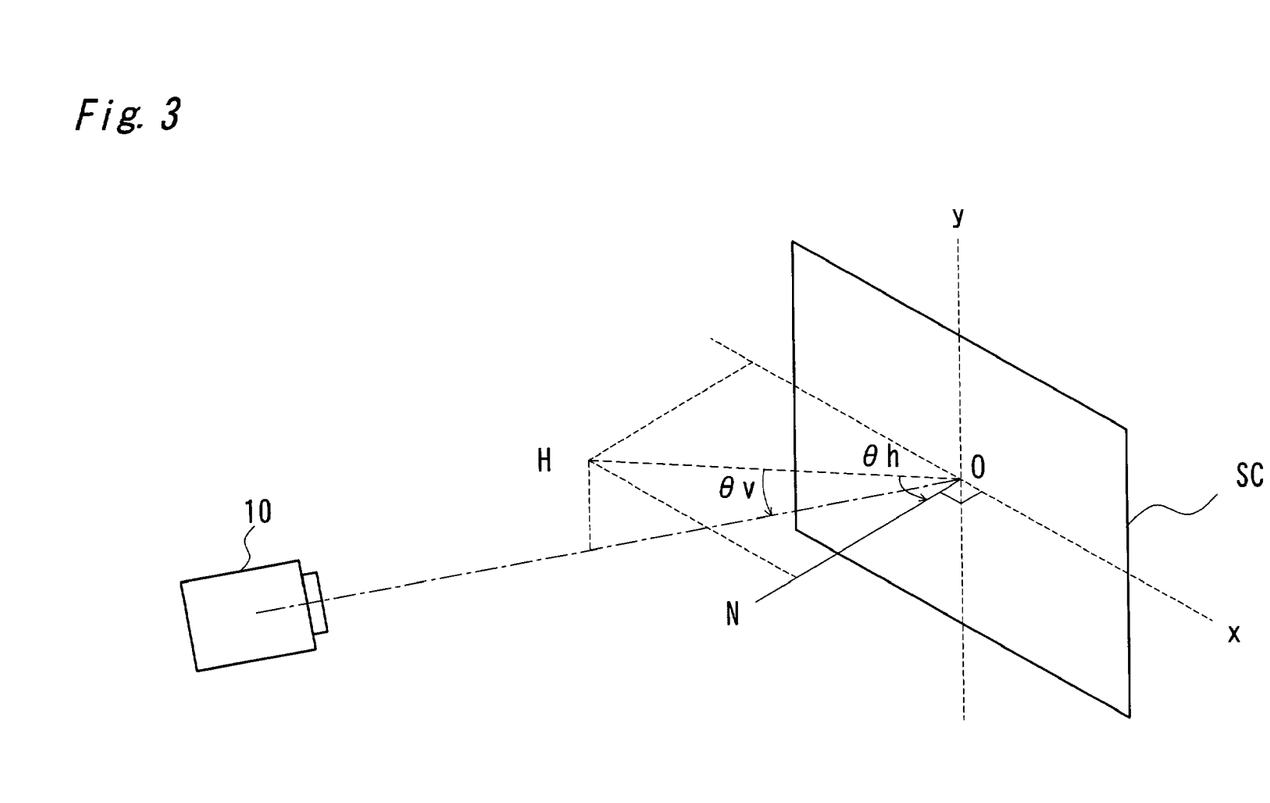
FIG. 3 shows respective components of an elevation angle.

The elevation angle input sub-module 71 inputs a vertical component θv and a horizontal component θh of the elevation angle. FIG. 3 shows the respective components of the elevation angle. The horizontal component θh of the elevation angle represents an angle formed by a normal line ON of the screen SC and a projected optical axis OH of the projection optical system 50 onto a plane defined by the x axis and the normal line ON of the screen SC. The vertical component θv of the elevation angle represents an angle formed by the optical axis of the projection optical system 50 of the projector 10 and the projected optical axis OH. Under the condition of no elevated projection, the elevation angle input sub-module 71 inputs a value '0' as the respective components of the elevation angle.

These values are the settings by the user with the remote control 40 according to the installation conditions of the projector 10. The input elevation angle is also used in the trapezoidal distortion correction module 64.

Figure 4A:
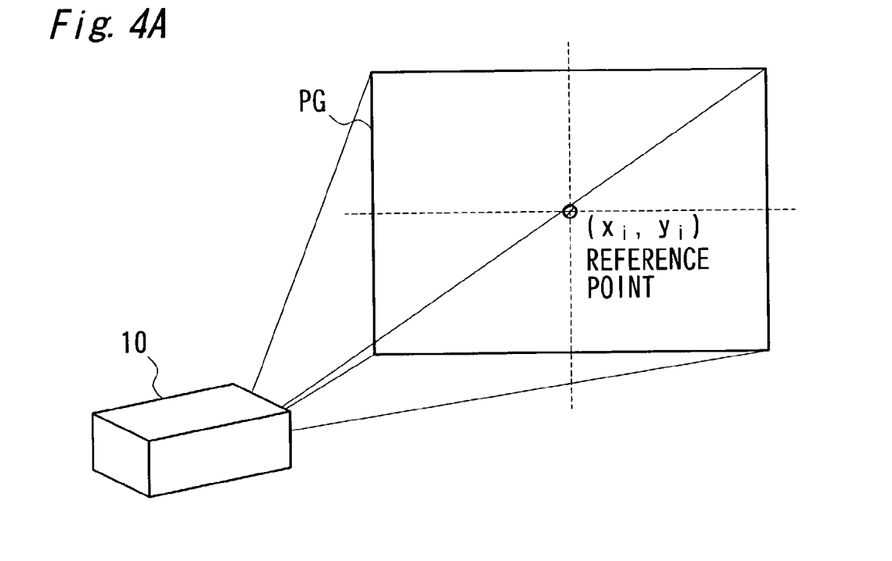
FIG. 4 shows settings of a reference point.
Figure 4B:
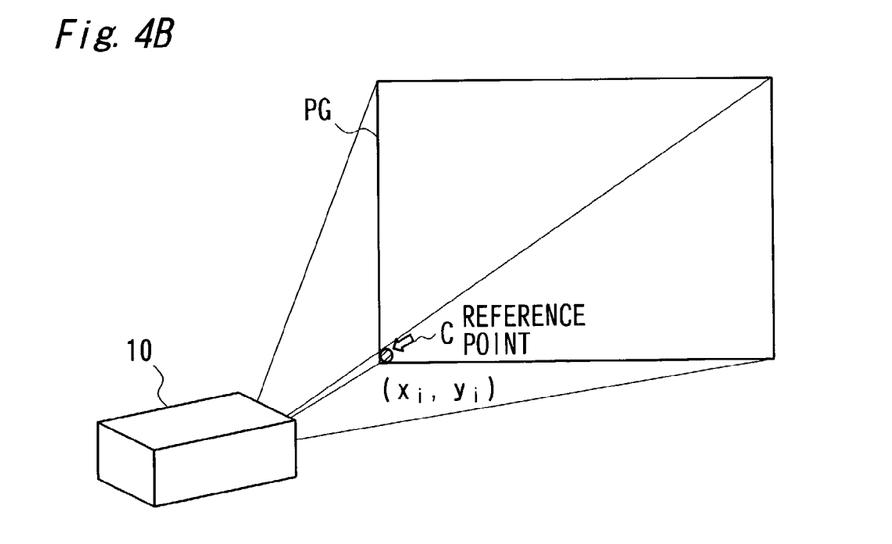

The reference input sub-module 72 inputs the position of a focal point, that is, the focalized position of a projected image PG, as a reference point $(x_i, y_i)$. FIG. 4 shows settings of the reference point. As shown in FIG. 4A, the default of the reference point is set at the center of the projected image PG. This is because the user often focuses a projected image at the center thereof. When utilizing the default reference point, the user should focus the projected image at the center thereof. The reference point is arbitrarily settable by the user. In one preferable application, 'entry of reference point' is specified as one option in a menu of various settings in the projector 10. In the example of FIG. 4B, the user shifts a cursor C to the lower left corner of the projected image PG with the remote control 40 to set the reference point at the lower left corner of the projected image PG. The user should focus the projected image at the arbitrarily set reference point.

The compensation coefficient generation sub-module 73 generates a compensation coefficient G used for sharpness adjustment on respective sites of an image, based on the vertical component θv and the horizontal component θh of the elevation angle and the reference point. The compensation coefficient G will be discussed in detail later.

C. Contour Compensation

Figure 5:
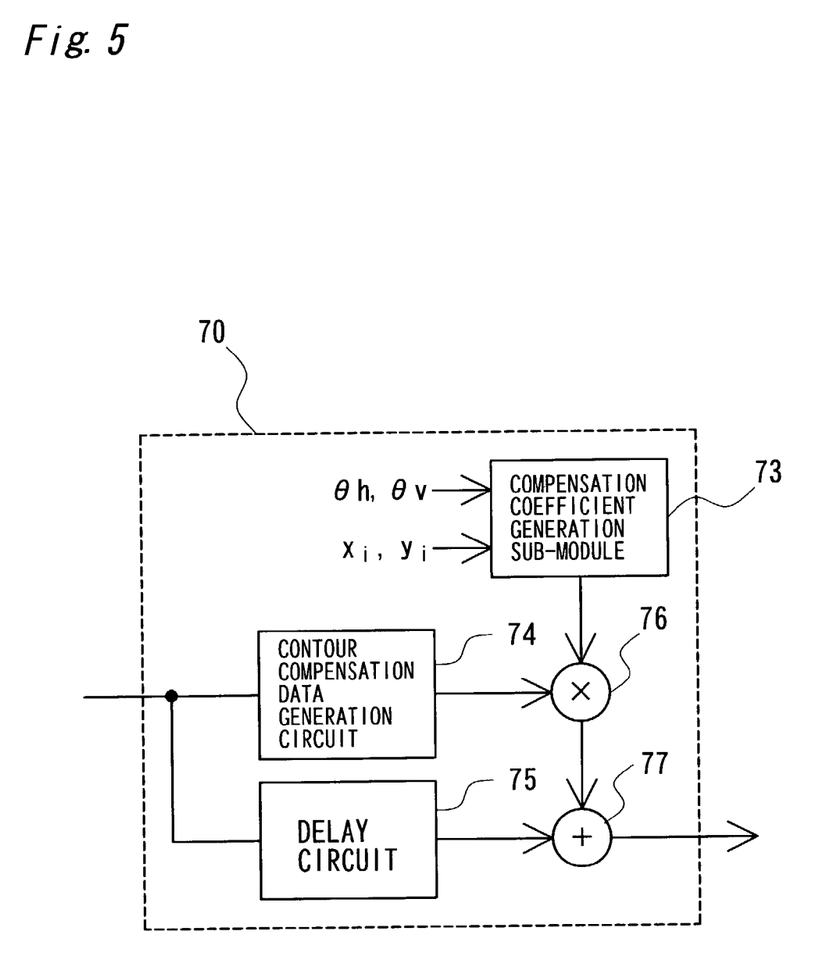
FIG. 5 is a block diagram illustrating the structure of a contour compensation module included in the video processor of FIG. 2.

FIG. 5 is a block diagram illustrating the structure of the contour compensation module 70. The contour compensation module 70 includes a contour compensation data generation circuit 74, a delay circuit 75, a multiplier 76, and an adder 77. A delay in the delay circuit 75 is one pixel in the horizontal direction and one line in the vertical direction.

Figure 6:
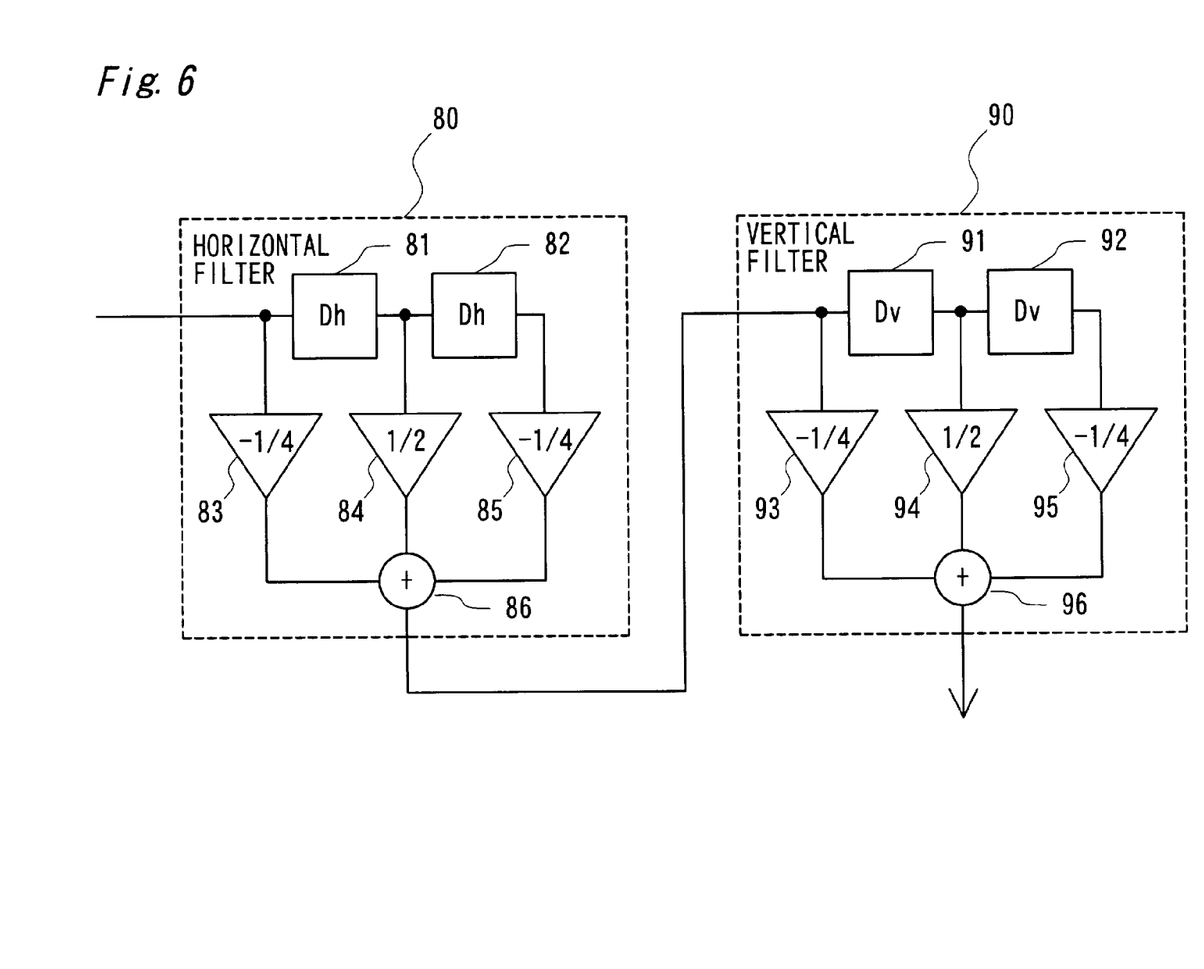
FIG. 6 is a block diagram illustrating the structure of a contour compensation data generation circuit included in the contour compensation module of FIG. 5.

FIG. 6 is a block diagram illustrating the structure of the contour compensation data generation circuit 74. The contour compensation data generation circuit 74 is a two-dimensional filter including a horizontal filter 80 and a vertical filter 90 connected in series. The horizontal filter 80 is an FIR filter (finite impulse response filter) including two horizontal delay circuits 81 and 82, three multipliers 83, 84, and 85, and an adder 86. A delay Dh in the horizontal delay circuits 81 and 82 is one pixel. Values multiplied in the multipliers 83, 84, and 85, that is, filter coefficients of the multipliers 83, 84, and 85 are respectively −¼, ½, and −¼. The vertical filter 90 has a similar construction to that of the horizontal filter 80. Namely the vertical filter 90 is an FIR filter including two vertical delay circuits 91, 92, three multipliers 93, 94, and 95, and an adder 96. A delay Dv in the vertical delay circuits 91 and 92 is one line. Values multiplied in the multipliers 93, 94, and 95, that is, filter coefficients of the multipliers 93, 94, and 95 are respectively −¼, ½, and −¼. These filter coefficients are standard values used for sharpness adjustment.

Figure 7:
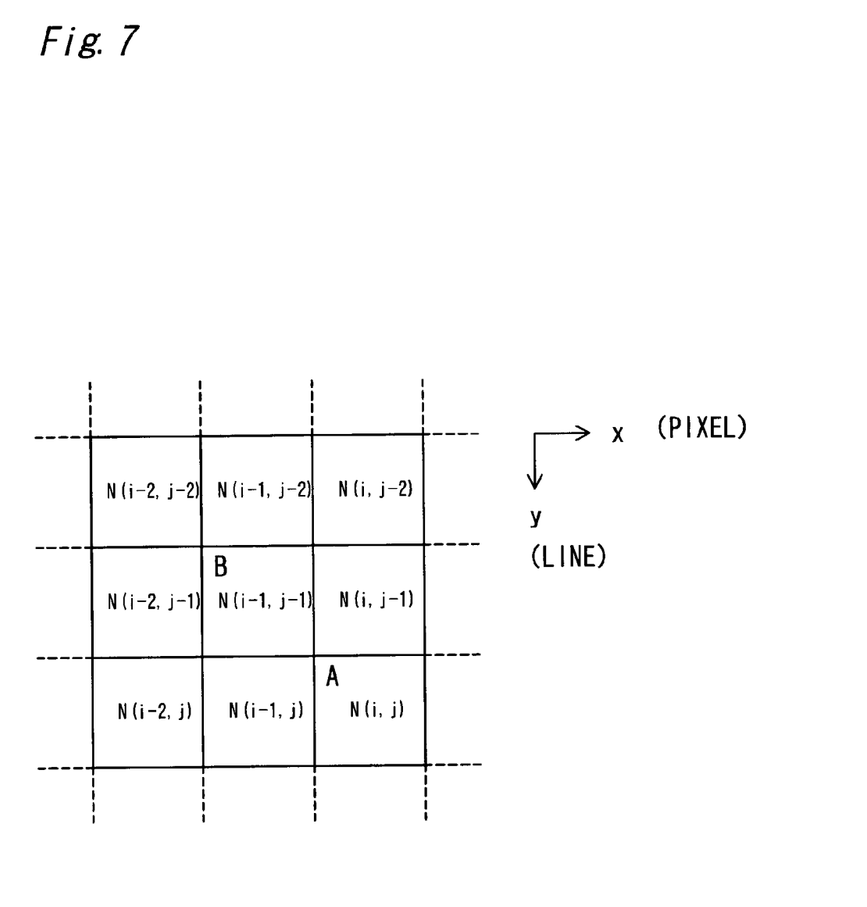
FIG. 7 shows image processing executed by the contour compensation module.

FIG. 7 shows image processing executed by the contour compensation module 70. Each rectangle in the drawing represents one pixel, and the value in each rectangle represents image data of the pixel. The contour compensation module 70 successively receives input of image data generated by the image quality adjustment module 68 (see FIG. 2) from the upper left corner of the image. It is here assumed that a series of image data have been input up to a pixel A on the lower right corner in FIG. 7. A pixel of interest subjected to image processing (sharpness adjustment) is a pixel B on the center of FIG. 7. This is because the delay in the delay circuit 75 is one pixel in the horizontal direction (in the x direction) and one line in the vertical direction (in the y direction). The contour compensation data generation circuit 74 generates contour compensation data, based on the image data of the illustrated 9 pixels. As clearly understood from FIG. 5, the contour compensation data is multiplied by the compensation coefficient G generated by the compensation coefficient generation sub-module 72. The product is then added to image data $N(i-1,j-1)$ of the pixel of interest B. The result of the addition gives image data of the pixel B after the contour compensation. This series of processing is executed successively with regard to all pixels. The compensation coefficient G is generated for each pixel and specifies the degree of emphasis in sharpness adjustment.

Figure 8A:
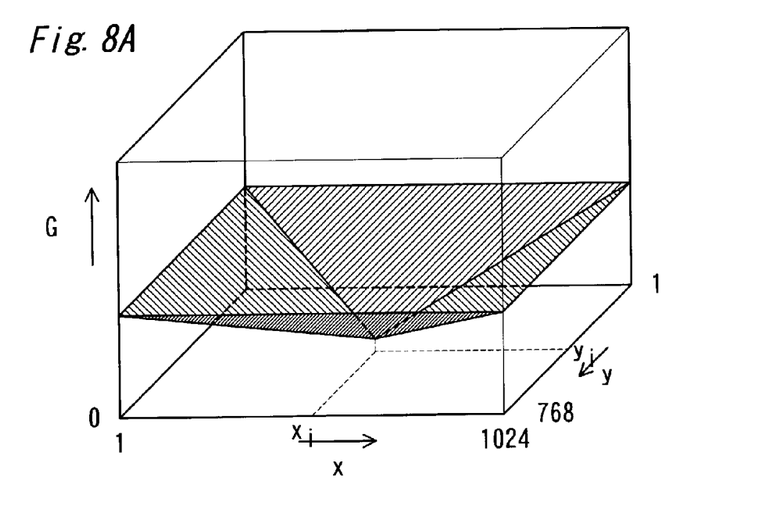
FIG. 8 shows distributions of a compensation coefficient G generated by a compensation coefficient generation sub-module in the contour compensation module.
Figure 8B:
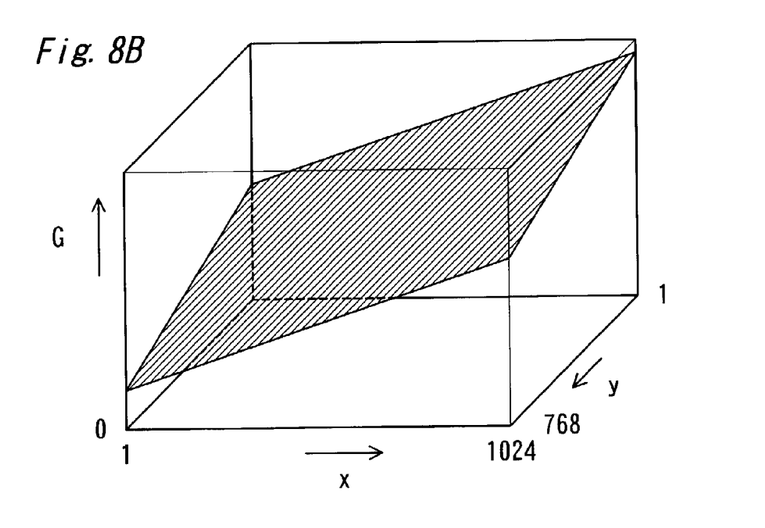

FIG. 8 shows distributions of the compensation coefficient G generated by the compensation coefficient generation sub-module 73. FIG. 8A shows a distribution of the compensation coefficient G when the reference point $(x_i,y_i)$ is set at the center of the image as shown in FIG. 4A. FIG. 8B shows a distribution of the compensation coefficient G when the reference point $(x_i,y_i)$ is set at the lower left corner of the image as shown in FIG. 4B. The compensation coefficient generation sub-module 73 generates the compensation coefficient G from the horizontal component θh and the vertical component θv of the elevation angle, the reference point $(x_i,y_i)$, and the position of the pixel of interest (x,y). The upper left corner of the image corresponds to a pixel position (1,1). In this embodiment, the compensation coefficient G(x,y) at each pixel position (x,y) is calculated according to the function given below:

$G(x,y)=1+A(x,\theta h)+B(y,\theta v)+C;$ where $A(x,\theta h)=\sin(\theta h\cdot\pi/180)\cdot|x-x_1|/x\_max$;
$B(x,\theta v)=\sin(\theta v\cdot\pi/180)\cdot|y-yi|/y\_max$; and
C denotes a constant.

In the above equation, $|x-x_1|$ and $|y-y_1|$ are values relating to the distance between the pixel of interest and the reference point, and x_max and y_max respectively correspond to number of pixels on the liquid crystal panel 32 in the horizontal direction and in the vertical directions. For example, when the liquid crystal panel 32 has a resolution XGA, x_max and y_max are respectively 1024 and 768. The constant C is arbitrarily settable and represents the degree of emphasis in sharpness adjustment over the whole image. The image quality adjustment module 68 (see FIG. 2) may carry out sharpness adjustment defined by the constant C in the image quality adjustment over the whole image.

In this embodiment, the compensation coefficient G is generated according to the independent, linear functions A and B in the horizontal direction and in the vertical direction. The compensation coefficient G may otherwise be generated according to another arbitrary function, based on the optical characteristics of the projection optical system 52. Dependent functions in the horizontal direction and in the vertical directions and non-linear functions may also be applicable.

Another procedure provides a lookup table representing a mapping of the distance between the pixel of interest and the reference point at each elevation angle to the compensation coefficient, and refers to the lookup table to generate the compensation coefficient. This method does not require the calculation and ensures high-speed generation of the compensation coefficient.

Figure 9:
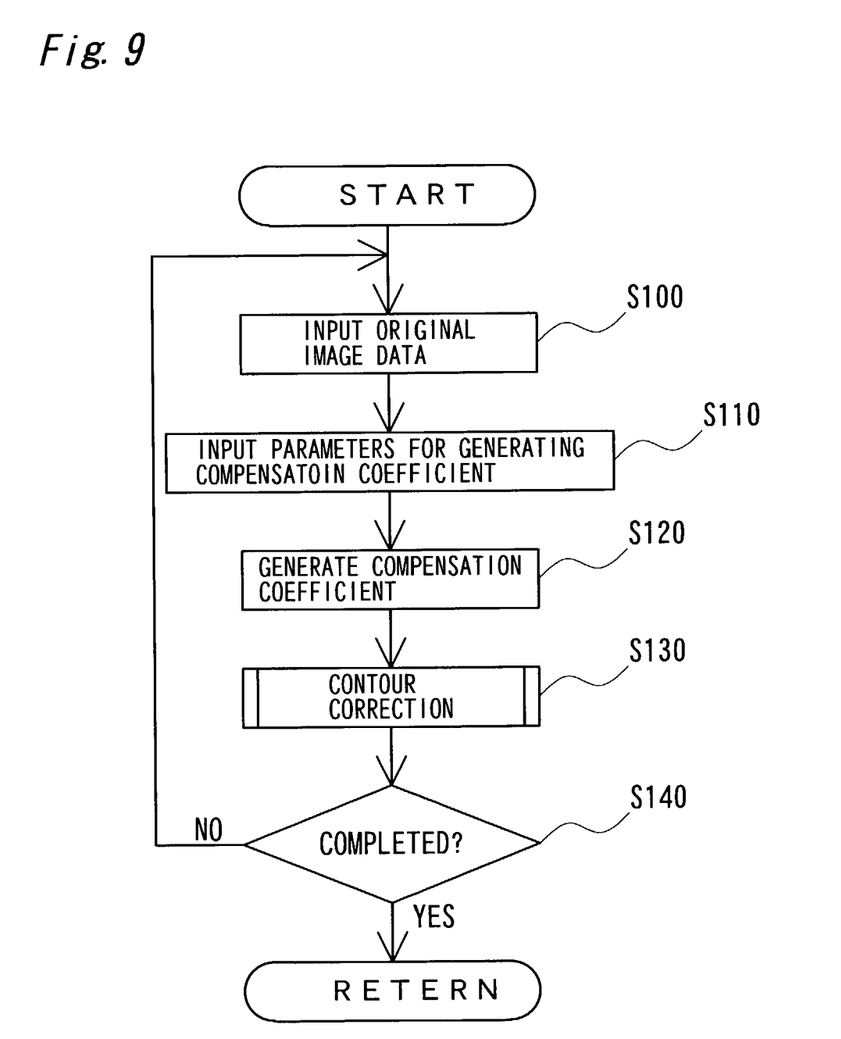
FIG. 9 is a flowchart showing a series of processing executed in the contour compensation module.

FIG. 9 is a flowchart showing a series of processing executed in the contour compensation module 70. This routine is carried out by a CPU of the video processor 26. The CPU first receives input of original image data (step S100). In this embodiment, the original image data is generated by the image quality adjustment module 68. The CPU subsequently receives the respective parameters for generating the compensation coefficient G (step S110), generates the compensation coefficient G for each pixel according to the function given previously (step S120), and carries out the contour compensation (sharpness adjustment) (step S130). It is then determined whether or not the processing has been concluded for all the pixels (step S140). When not concluded, the processing of steps S100 through S130 is repeated. When concluded for all the pixels, the program exits from this routine. The processed image data are transmitted to the liquid crystal panel actuation module 30.

In projection of an image with the projector 10, even when the focal distance of the projection optical system is adjusted, there is strictly only one focalized point on the screen SC. Namely the slight out-of-focus state at other positions lowers the image quality. The projector 10 of this embodiment makes the image data subjected to the sharpness adjustment to compensate for the out-of-focus state with different degrees of emphasis for the respective pixels. This arrangement effectively prevents deterioration of the image quality by the simple image processing without any optical adjustment with regard to each pixel. The degree of emphasis in sharpness adjustment may be varied with regard to each pixel, based on the elevation angle of the projector 10 relative to the normal line of the screen SC and the reference point (focalized position), so that image processing is flexibly carried out according to diverse installation conditions.

D. Modifications

The above embodiment and its modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. Some examples of possible modification are given below.

D1. Modified Example 1

Figure 10:
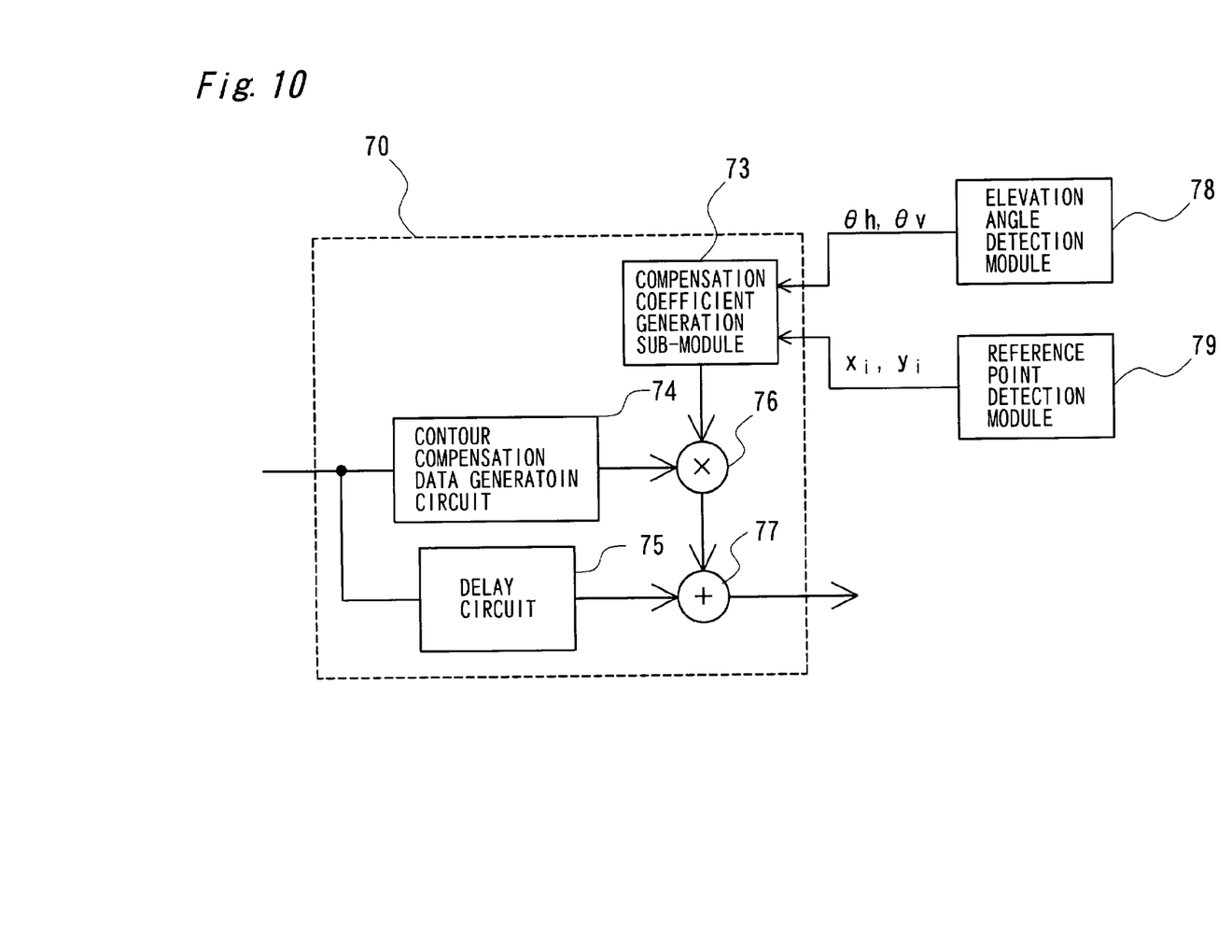
FIG. 10 is a block diagram illustrating the structure of a contour compensation module in another projector as a modified example.

FIG. 10 is a block diagram illustrating the structure of a contour compensation module 70A in another projector 10A as a modified example. The projector 10A has an elevation angle detection module 78 and a reference point detection module 79, in addition to the constituents of the projector 10 of the above embodiment. The contour compensation module 70A is connected to these modules 78 and 79. The elevation angle detection module 78 measures distances to preset three points on the screen SC with an ultrasonic sensor, and automatically detects the vertical component and the horizontal component of the elevation angle based on the measurement result. Another means may alternatively be used to detect the vertical component and the horizontal component of the elevation angle. The detection result of the elevation angle detection module 78 is input into the elevation angle input sub-module 71 (see FIG. 2). The reference point detection module 79 includes an imaging device and a detection device (neither shown) that analyzes the spatial frequency of a pickup image to detect the focalized position, and automatically detects the focalized position of the projected image. The focalized position detected by the reference point detection module 79 is input as the reference point into the reference point input sub-module 72. In the process of automatically detecting the focalized position, the preferable procedure projects a test image having a predetermined spatial frequency, picks up the projected test image, and analyzes the pickup test image. This procedure enables the focalized position to be detected with high accuracy from the distribution of the spatial frequency of the projected test image. The projector 10A of the modified example automatically receives input of the elevation angle and the reference point and executes image processing based on the input. This arrangement ensures enhanced convenience of the projector.

D2. Modified Example 2

The procedure of the above embodiment carries out the sharpness adjustment with the varying degree of emphasis for the respective pixels. One modified procedure may carry out the sharpness adjustment with the varying degree of emphasis for the respective image areas. For example, an identical compensation coefficient is applied for each 8×8 block (image area) in the image, and the sharpness adjustment is carried out with compensation coefficients corresponding to the distances between the reference point and the centers of the respective blocks.

D3. Modified Example 3

The procedure of the above embodiment carries out the sharpness adjustment with the varying degree of emphasis for the respective pixels. In general, the present invention performs image processing to emphasize the articulation of the display with different degrees of emphasis for the respective sites of the image projected by the projector. The image processing is thus not restricted to the sharpness adjustment but may be any adjustment affecting the articulation of the display, for example, contrast adjustment or luminance adjustment, at each site of the projected image.

D4. Modified Example 4

The procedure of the above embodiment applies the elevation angle and the focalized position as the parameters for generating the compensation coefficient. The distance between the projector and the screen may also be used as one of the parameters, since the distance between the projector and the screen affects the articulation of the projected image.

D5. Modified Example 5

In the above embodiment, the two-dimensional digital FIR filter is used for the contour compensation data generation circuit 74. Another filter, for example, an analog filter or a spatial filter, may be used instead. The filtering process may otherwise be implemented by software.

D6. Modified Example 6

The above embodiment regards the construction of the projector utilizing the transmission-type liquid crystal panel. The technique of the present invention is also applicable to other types of projectors, such as those utilizing a reflection-type liquid crystal panel, those utilizing a Micro Mirror Device (trademark), and those utilizing a CRT. The projector may be a front projector or a rear projector.

The scope and spirit of the present invention are indicated by the appended claims, rather than by the foregoing description.

What is claimed is:

1. An image processing apparatus that carries out a predetermined series of image processing with regard to original image data, so as to generate processed image data, which is supplied to a projector that projects a resulting image, said image processing apparatus comprising:
   an original image data input module that receives input of original image data; and
   an image processing module that makes the original image data subjected to specific image processing that emphasizes articulation of display with a varying degree of emphasis for respective sites of the projected image,
   wherein the degree of emphasis is varied depending upon a distance from a reference point set relative to the projected image.

2. An image processing apparatus in accordance with claim 1, wherein the specific image processing is sharpness adjustment.

3. An image processing apparatus in accordance with claim 1, wherein the reference point is a focalized position of the projected image.

4. An image processing apparatus in accordance with claim 3, said image processing apparatus further comprising:
   an imaging module that picks up the projected image; and
   a focalized position detection module that analyzes the pickup image to detect the focalized position.

5. An image processing apparatus in accordance with claim 1, wherein the degree of emphasis is varied depending upon an angle defined by an optical axis of said projector and a normal line of a screen on which the image is projected.

6. An image processing apparatus in accordance with claim 5, said image processing apparatus further comprising:
   an elevation angle detection module that detects an elevation angle, which is defined by the optical axis of said projector and the normal line of said screen on which the image is projected.

7. An image processing apparatus in accordance with claim 1, said image processing apparatus further comprising:
   a compensation coefficient storage module that stores in advance a mapping of a compensation coefficient, which is used for emphasizing the articulation of display, to each site,
   wherein said image processing module carries out the specific image processing with the compensation coefficient given by said compensation coefficient storage module.

8. A projector that projects an image, comprising:
- an image processing module that carries out a predetermined series of image processing with regard to input original image data, so as to generate processed image data;
- an image generation module that generates an image to be projected, based on the processed image data; and
- a projection optical system that projects the image,
- wherein said image processing module makes the original image data subjected to specific image processing that emphasizes articulation of display with a varying degree of emphasis for respective sites of the projected image,
- wherein the degree of emphasis is varied depending upon a distance from a reference point set relative to the projected image.

9. An image processing method that carries out a predetermined series of image processing with regard to original image data, so as to generate processed image data, which is supplied to a projector that projects a resulting image, said image processing method comprising the steps of:
- (a) receiving input of original image data; and
- (b) making the original image data subjected to specific image processing that emphasizes articulation of display with a varying degree of emphasis for respective sites of the projected image,
- wherein the degree of emphasis is varied depending upon a distance from a reference point set relative to the projected image.

10. A recording medium in which a computer program is recorded in a computer readable manner, said computer program carrying out a predetermined series of image processing with regard to original image data, so as to generate processed image data, which is supplied to a projector that projects a resulting image, said computer program causing a computer to attain the functions of:
- receiving input of original image data; and
- making the original image data subjected to specific image processing that emphasizes articulation of display with a varying degree of emphasis for respective sites of the projected image,
- wherein the degree of emphasis is varied depending upon a distance from a reference point set relative to the projected image.

* * * * *